United States Patent [19]

Cardot et al.

[11] 4,166,970

[45] Sep. 4, 1979

[54] APPARATUS AND METHOD FOR SHIFTING A HEAD MOVABLE RELATIVE TO A CARRIER FOR RECORDED INFORMATION

[75] Inventors: Claude R. Cardot, Paris; Gérard E. Democrate, Plaisir; Jacques P. Droux, Paris; André J. Oisel, Elancourt; Guy Prival, Mennecy, all of France

[73] Assignee: Compagnie Internationale pour l'Information Cii Honeywell Bull, Paris, France

[21] Appl. No.: 753,809

[22] Filed: Dec. 23, 1976

[30] Foreign Application Priority Data

Dec. 24, 1975 [FR] France .................. 75 39654

[51] Int. Cl.² .............................................. G05B 13/00
[52] U.S. Cl. .................................... 318/561; 318/594; 360/78
[58] Field of Search ............... 360/78, 77; 318/561, 318/594, 612, 373

[56] References Cited

U.S. PATENT DOCUMENTS

| | | | |
|---|---|---|---|
| 3,584,284 | 6/1971 | Beach et al. | 318/569 |
| 3,668,494 | 6/1972 | Agin | 318/612 |
| 3,731,177 | 5/1973 | Commander et al. | 318/603 |
| 3,737,751 | 6/1973 | Lima | 318/373 |
| 3,855,513 | 12/1974 | Brunner | 318/561 |
| 3,895,277 | 7/1975 | Klumpp | 318/373 |
| 4,027,338 | 5/1977 | Kril | 360/77 |

*Primary Examiner*—J. V. Truhe
*Assistant Examiner*—Eugene S. Indyk
*Attorney, Agent, or Firm*—Lowe, King, Price & Becker

[57] ABSTRACT

A read/write head moves relative to magnetic discs having track addresses recorded thereon in Gray code in a plurality of reference zones. The head is moved by an electric motor and reads information as the head is shifted from a starting track to a destination track. The address of the destination track is expressed in weighted, i.e., standard, binary code, and is stored in a register. The address of the head is read by a read element of the head from the recording tracks. In response to the initial and destination tracks, an intermediate track C, approximately halfway between the initial and destination tracks, is calculated. The head is accelerated from the initial track to the intermediate track by feeding a motor for driving the head with a constant current. In response to the head detecting the address of the intermediate track, the current supplied to the motor is reversed so that the head is decelerated. The calculations and comparisons are performed in the weighted, binary code. The reverse polarity current is applied to the motor until the speed of the head, as determined exclusively in response to addresses read by the head, is lower than a minimum threshold. In response to the speed of the head being detected as less than the minimum threshold, the flow of current to the motor is cut off, at which time the address of the track is compared with the destination track. In response to these two addresses differing, the sequence of steps is repeated.

11 Claims, 13 Drawing Figures

| 0 | 0 | 1 | 0 | 0 | 0 | 1 | 1 | — ZRPi 125
| 0 | 0 | 1 | 0 | 0 | 0 | 0 | 1 | 0 | — ZRPi 124
Fig. 2e
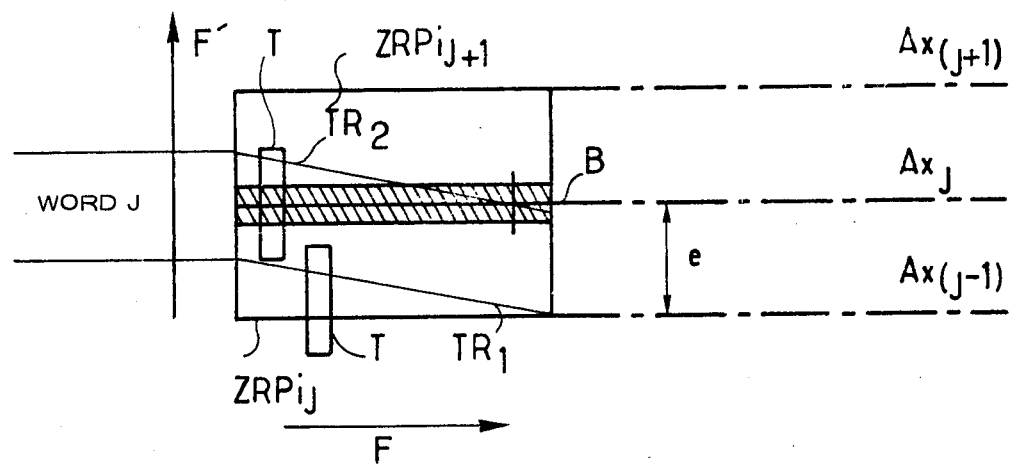
Fig. 2f
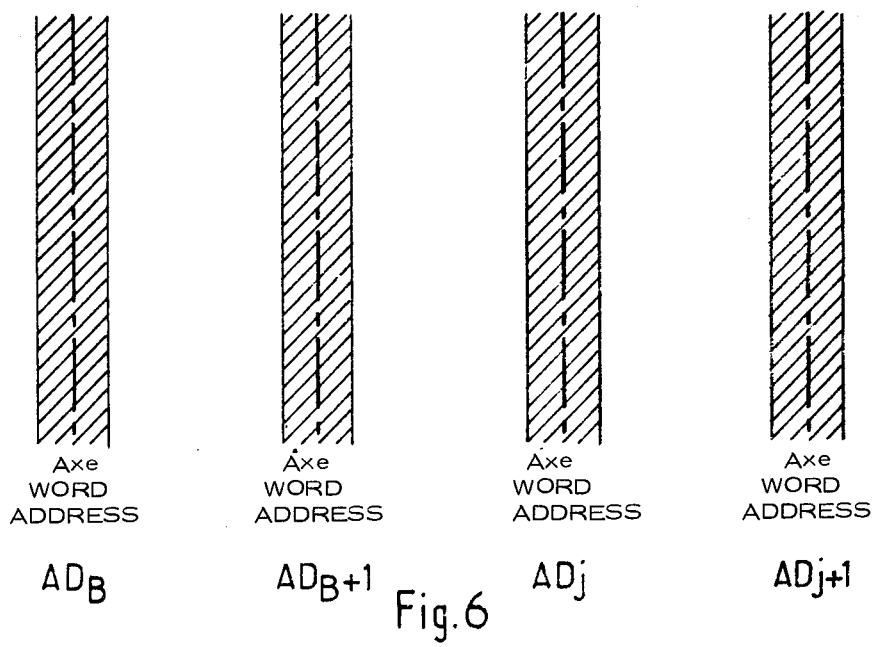
Fig. 6

APPARATUS AND METHOD FOR SHIFTING A HEAD MOVABLE RELATIVE TO A CARRIER FOR RECORDED INFORMATION

FIELD OF THE INVENTION

The present invention relates to apparatus for and methods of shifting a read out head relative to a carrier for recorded information and more particularly to an apparatus for and a method of controlling the position of magnetic read/write heads for a data processing system disc memory only in response to addresses read from the disc and a binary input command signal.

BACKGROUND OF THE INVENTION

In present data processing systems, use is more and more frequently being made of magnetic disc memories because of their storage capacity and the relatively short time required for magnetic read/write heads to reach information anywhere on the discs from the moment the processing system supplies the heads with an instruction to find the information.

Magnetic discs carry information on concentric circular recording tracks having a width which does not exceed a few hundredths of a millimeter and which are formed on both faces of the disc. The tracks are identified by allotting them a serial number j (j being a positive integer) between 0 and N−1, where N is the total number of recording tracks. To enable information to be read and written, the magnetic heads are arranged on both sides of a disc a few microns away from it. To minimize the time to reach given information, it is necessary for the heads to move from a first track to a second track in the shortest possible time and to be positioned over the second track.

There are known shifting and positioning arrangements which meet these requirements. Certain of the known arrangements, known as bang-bang arrangements, use a voice-coil type of an electrodynamic motor, having a winding which moves linearly within a permanent magnet of cylindrical shape. The motor winding is mechanically connected to a carriage which carries the magnetic heads. This carriage includes two electromechanical transducers, one for position to determine the number of the track above which the heads are situated at any given time, and the other to determine the speed of the carriage at any given time.

The device for shifting and positioning the heads is moved with an acceleration phase and a deceleration phase, respectively termed the first and second bangs. During the acceleration phase, a constant current of a first polarity (positive, for instance) is applied to the motor winding, whereby the speed vs. time characteristic of the carriage (and thus of the heads) is similar to a rising linear function of the time that the carriage has been moving. A curve representing carriage speed as a function of carriage position at any given time is an ascending parabolic arc since speed increases as a function of position.

During the second, deceleration, phase of the movement, a reverse polarity current (negative, for instance) is applied to the motor. The carriage speed is then a falling linear function of time and the curve representing carriage speed as a function of carriage position is a parabolic arc, since speed decreases as a function of position. In order to stop the heads over the selected tracks, the carriage must have a low speed and the carriage must be close to the selected track at the end of the second phase.

It is the normal, present practice for the shifting and positioning devices to operate in a free state during the first phase, i.e., without being under control, whereas during the second phase these devices are servo-controlled with the speed characteristic of the carriage as a function of both time and space being as close as possible to what it would be in the free state. Servo-control means, including analogue and logic circuits, apply a constant current to the motor winding during the first phase of the carriage movement. During the second phase, the servo-control means responds to speed and position transducers to supply the winding with a current having a level which is a function of the remaining distance to be travelled and the actual speed of the carriage at any given time, so that the speed of the heads is zero when they arrive above the selected track.

It will be recalled that analogue circuits emit analogue signals having voltages that vary continuously between values of $+V$ and $-V$, while logic circuits emit binary signals which assume only two values, either a "logic zero" or a "logic one". (In one system, "logic zero" is generally a voltage of 0 volts and "logic one" a voltage of $+5$ volts). In the art, each logic signal is known as a "bit".

With the current practice, if P is assumed to be the number of tracks to be traversed, the direction of the current in the coil is reversed when the head has traversed N' tracks, where N' is approximately P/2, to within a few tracks or even a few tens of tracks. Thus, to control the current in the winding it is necessary at any given time to have an accurate knowledge of the position and speed of the movable carriage. The electromechanical position and speed transducers and the circuits (chiefly analogue) associated with them thus must be extremely accurate and have the drawback of being expensive and bulky.

BRIEF DESCRIPTION OF THE INVENTION

The present invention relates to an apparatus for and method of shifting a system which is movable relative to a carrier for recorded information, and enables the drawbacks of the prior art to be obviated by dispensing with the position and speed transducers. In the present apparatus and method, the track address referred to as the serial number of the track over which the heads are situated, as read by one of the heads, is the sole item of information used to control the current in the winding of the electro-dynamic motor.

In accordance with the invention, a motor for driving a transducing head for a record containing binary coded positional information (e.g., the address of a disc track) is controlled in response to a binary command signal for the head position. The motor is accelerated during a first portion of the time required to go from the position of the record when the command signal is initially derived and is decelerated or braked during the remainder of the time required to go from the initial position to the position indicated by the command signal. The motor is accelerated and decelerated by rectangular current pulses of opposite polarity such that the head has very slow speed at the end of the second pulse; preferably the current pulses have equal amplitudes and durations. In response to the speed of the head dropping below a predetermined value, as determined exclusively by the positional information read by the head (i.e., the address read by the head), the head is stopped by removing the current supplied to the motor. The head position read by the transducer is compared with the command signal and the sequence is repeated, if they are not equal.

More particularly, what is involved is a method of shifting a transducing head which is movable relative to a carrier for recorded information. The information is carried by a plurality of recording tracks having addresses recorded on the carrier in a plurality of reference zones, at least equal in number to the tracks. Each track is associated with at least one zone. The head is moved by an electric motor and reads the information which is shifted from a starting track A, where the head is initially positioned, to a destination track B, the address of which is indicated by the command signal and is derived from an address handling circuit. The shift from track A to track B is in two phases: one for acceleration in which the motor is fed with a constant current, from track A to a track C (intermediate tracks A and B) at which the current is reversed, the other for deceleration, beginning at track C.

The method is particularly characterized by:

the addresses of the tracks being recorded in a reflected binary code, sometimes referred to as a cyclic binary or Gray code;

the address of track C being calculated as a function of addresses A and B, these three addresses being expressed in weighted, i.e., standard, binary code;

the addresses of the tracks, which are read by the reading member as the shift occurs, being stored and then decoded from reflected binary code into weighted binary code;

these decoding addresses being compared with the address of track C during the acceleration phase;

the acceleration phase continues until the head reaches track C;

the head is then decelerated until the speed of the head is less than a minimum threshold level Vo which is calculated from the addresses read;

the address of the track at which the head, i.e., reading member, comes to a halt is compared with the address of track B; and a fresh shift is made if these addresses differ.

The invention also relates to an apparatus for performing the method by driving a current generator for the motor. In particular, the apparatus for driving the generator comprises:

means R for storing address destination information, the input of means R is connected to the handling circuit;

means TRANSCOD for storing and decoding the addresses read by the reading member, first and second inputs of means TRANSCOD respectively connected to the output of the reading member and to the output of a generator GEN for generating sampling pulses;

a circuit CIRCADEX for determining the correct address ADj of the recording track at which the reading member is situated, the input of circuit CIRCADEX is connected to the output of storage and decoding means TRANSCOD;

a first address comparator ADCOMP having first and second inputs respectively connected to the output of the storage means R and to the output of circuit CIRCADEX;

a calculator INV for calculating the address ADI of track C, calculator INV has inputs which are connected to the outputs of (1) circuit CIRCADEX, (2) storage means R, and (3) address comparator ADCOMP, and calculator INV has a first output connected to a first input of a generator ALIM for supplying current to the motor; a closed loop is formed by the combination formed by generator ALIM, electric motor M, the information reading member, the storage and decoding means TRANSCOD, circuit CIRCADEX, the first address comparator ADCOMP and the reversal calculator INV;

a second address comparator COMP having inputs connected to the output of circuit CIRCADEX and to a second output of calculator INV and an output connected to a second input of generator ALIM, and a detector DETECT for detecting slow speeds of the reading member, detector DETECT has an input connected to the output of circuit CIRCADEX so that it is responsive solely to addresses read by the reading member, and detector DETECT has an output connected to a third input of generator ALIM.

It can be seen that the invention makes it possible to simplify the circuits for controlling the movement and position of the heads by using only logic circuits, these being less bulky, less expensive, more accurate and more reliable than the analogue circuits which are currently employed.

Other features and advantages of the invention will become apparent from the following description, which is given by way of a non-limiting illustration, and from reference to the accompanying drawings.

BRIEF DESCRIPTION OF THE DRAWINGS

FIG. 6 is an illustration to indicate the principle on which the destination track is checked.

DETAILED DESCRIPTION OF THE INVENTION

To provide a better understanding of the principles for shifting and positioning a read head relative to a carrier for recorded information in accordance with the invention, it is useful to review a few facts, illustrated by FIGS. 1a–1c and FIGS. 2a–2d, about shifting arrangements of the bang-bang type and about the principles on which the addresses of recording tracks are inscribed on magnetic discs. A magnetic disc memory of a data-processing system will be considered as an exemplary record carrying positional information, in the form of addresses recorded in binary form. An arrangement of the bang-bang type shifts and positions a translatorily movable system formed by a movable winding of a linear electrodynamic motor of the voice-coil type. The winding is secured to a carriage which carries the magnetic read/write heads for the discs. The winding is fed with a negative or positive current. Since the winding is positioned inside a permanent magnet of cylindrical shape it moves in one direction or the other depending on the polarity of the current which it receives.

To simplify the exposition, the following limitations are made:

(1) there is only a single magnetic head T above a single magnetic disc D, (2) the magnetic head T moves from a track A to a track B, (3) the path followed by the head between the tracks is a straight line.

During the first bang, a positive current pulse, (+I, see FIG. 1a) is applied to the winding of the motor. The curve representing the pattern of speed build-up as a function of time t during the first bang is a straight line 01M between times t1 and tm respectively at the beginning and end of the first bang (see FIG. 1b).

At the mid-point C of the distance between tracks A and B, at time $tm=(t1+t2)/2$, the transition from the first bang to the second bang occurs and a negative current pulse (−I) is applied to the winding of the motor. During the second bang, speed decreases linearly as a function of time t. The curve for speed versus time is thus a straight line MO2 between times tm and t2. It can be shown that for the speed-time curve of FIG. 1b there is a corresponding curve for speed (Vx) as a function of head distance travelled, the corresponding curve is represented by parabolic arcs AC′ and C′B (see FIG. 1c). The curves 01M02 and AC′B are thus characteristic of the operation of a shifting and positioning arrangement of the bang-bang type.

Figure 1A:
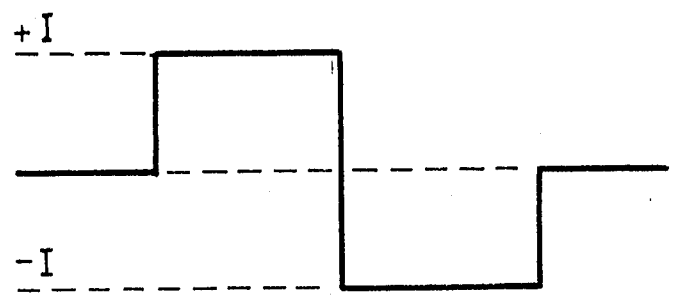
FIG. 1 includes waveforms to illustrate the basic principle of a bang-bang system.
Figure 1B:
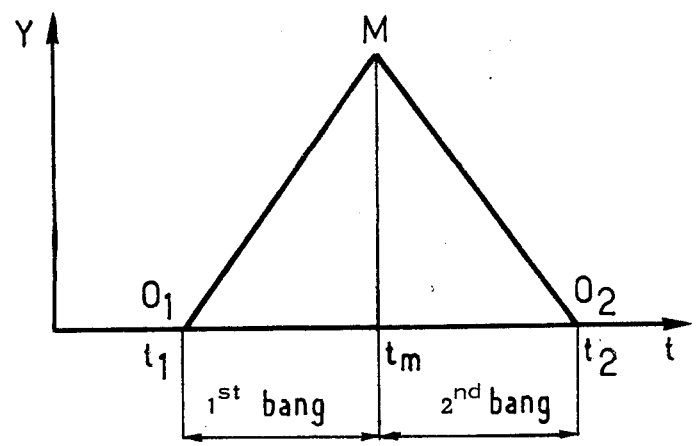
Figure 1C:
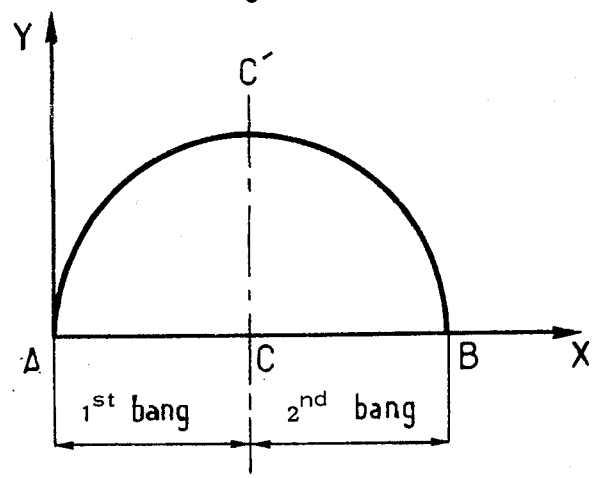
Figure 2A:
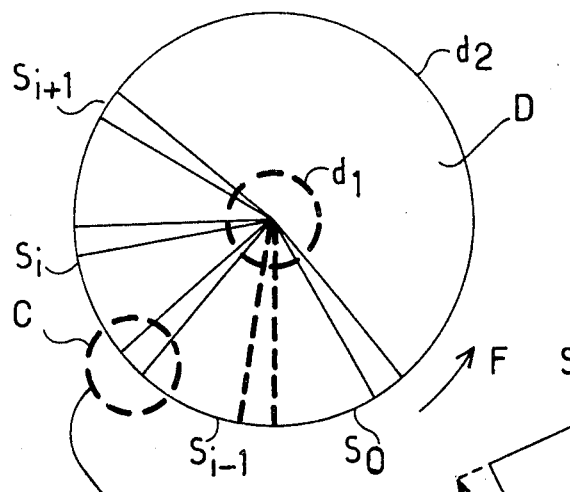
FIGS. 2 and 2f are illustrations of how addresses are recorded on the magnetic discs.
Figure 2B:
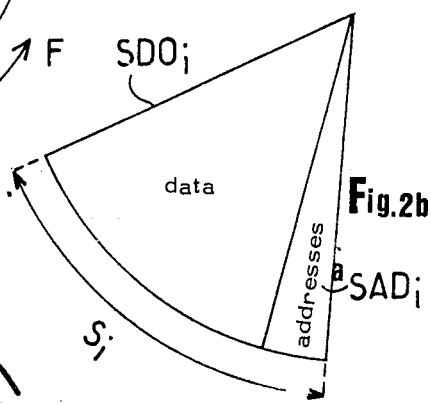

In FIG. 2a, there is shown a magnetic disc D, rotating in the direction of arrow F, having a useful recording area bounded by circles d1 and d2. On disc D, n equal length sectors SO, ... Si ... Sn of a circle are demarcated; only sectors SO, Si−1, Si and Si+1 are illustrated. As can better be seen in FIG. 2b, each sector is divided into two parts SADi and SDOi in which are respectively recorded the addresses of the tracks and the data intended for processing by the data processing system including the disc memory. The area of part SADi is much smaller than that of part SDOi.

Figure 2C:
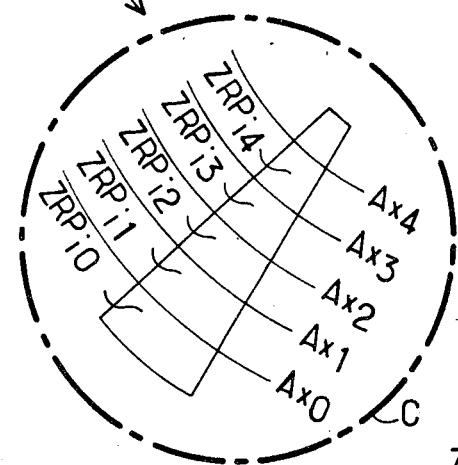
Figure 2D:
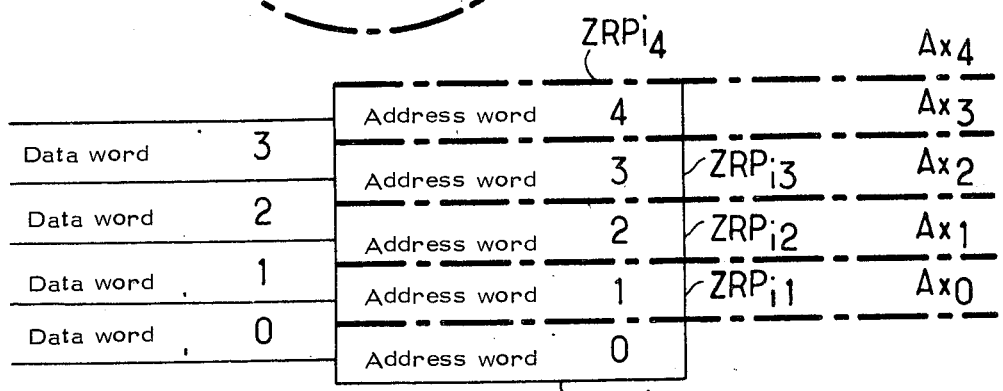

In FIGS. 2c and 2d are enlarged views of the SADi part of sector Si which is contained within circle C to show in greater detail how parts SADi of the sectors Si are formed. Each part SADi of a sector Si is divided into N zones ZRPio ... ZRPij ... ZRPiN, N being an integer representing the number of magnetic tracks on the disc D. In FIGS. 2c and 2d only the first five zones ZRPio to ZRPi4 are shown for the sake of simplicity. The boundaries between the various zones ZRPij are the circumferences Axj of the magnetic tracks. Each magnetic track of serial number j and circumference Axj has a zone ZRPij associated with it. Thus, track 0 is associated with zone ZRPio, track 1 with zone ZRPi1 and so on.

To simplify FIG. 2d, the zones ZRPij are shown as rectangular. Each zone ZRPij contains the address of the track with which it is associated. The zones ZRPij are termed reference zones for positioning. As can be seen in FIG. 2d, zone ZRPio contains the address of track 0, zones ZRPi1 the address of track 1, zone ZRPi2 the address of track 2 and so on.

In accordance with one aspect of the invention, the addresses of the tracks are written in a reflected binary code termed the Gray code. A description of such a code is given, for example, in a book by H. Soubies-Camy published by Editions Dunod in 1961, on pages 253 and 254. An example of two successive written in Gray code, those of tracks 124 and 125, is shown in FIG. 2e. This example illsutrates the chief characteristic of the Gray code, namely that two successive addresses are distinguished by a change between them in only one "bit". Thus, the two adjacent addresses 124 and 125, when written in Gray code, differ only in their final bit, which is 0 in the case of track 124 and 1 in the case of track 125.

FIG. 2f will now be considered. Let it be assumed that a magnetic read head T is over the zone ZRPij which is associated with track number j. Let it also be assumed that the maximum speed of head T is such that, while it is moving above zone ZRPij, the distance x which it travels is equal to or less than the width e of zone ZRPij.

If the direction of movement of disc D is indicated by arrow F and that of head T above disc D by arrow F′ and that of head T above disc D by arrow F′, the path of head T relative to zone ZRPij lies somewhere between the extreme paths TR1 and TR2. It is possible for head T, when it moves aove zone ZRPij, to find itself straddling boundary Axj of track j and overlapping into zones ZRPij and ZRPi(j+1).

Thus, in a band B (that has no particular relation to address B) situated on either side of the boundary Axj, the address of the track above which the head is situated is read ambiguously. Because use is made of the Gray code, the ambiguity with which the address of a given track is read lies in the bit which distinguishes the address of this track from that of the adjoining track. In the case of tracks 124 and 125, the least significant bit (i.e., the one farthest to the right) is doubtful. The use of the Gray code thus enables reading errors to be restricted to a single track.

It can be seen that for a track having a number j and an address ADj, the address AD read by the head is not necessarily equal to ADj and the possibilities are either AD≡Adj or AD≡ADj+1. To make things simpler, address ADj will be referred to below as the "correct address" in contrast to the read address AD.

During the time when head T is moving above the disc D, it is necessary at all times to know the correct address ADj of the track above which the head is situated (in particular when the head is close to track B) and thus permanently to resolve the reading ambiguity arising from the doubtful bit.

While it is advantageous to use the Gray code for reading addresses, the Gray code is not advantageous for the arithmetical and logic operations which are performed to shift and position the head relative to the carrier for recorded information. These operations are calculating the address difference (ADA−ADB) and the address ADI of the track at which the current in the winding of the motor is to be reversed. To perform these calculations, it is necessary to convert the Gray code into a natural binary code, also termed a weighted code (for natural binary codes see page 245 of the book by H. Soubies-Camy mentioned above).

In brief, the principle on which the shifting and positioning arrangement according to the invention operates includes four successive operations (see FIG. 1):

Operation 1: Acceleration (with the supply current to the winding equal to +I for example) during half the shift, from the starting track A (address ADA) to track C (address ADI), where the direction of the current in the winding of the electrodynamic motor is reversed.

Operation 2: Braking (with the supply current equal to −I for example) beginning from track C of address ADI.

Operation 3: Reversion to zero current and change-over to servocontrol of the position of head T, beginning from the moment at which the speed of head T is sufficiently slow, i.e., is below a minimum speed threshold Vo.

Operation 4: Checking whether the head T has in fact arrived over the intended track. If the address of the track above which the head halts differs from the address ADB of track B, a fresh shift must be made following the procedure defined by Operations 1 to 4.

It can thus be said that the arrangement according to the invention for shifting and positioning a head which is movable relative to a carrier for recorded information is slaved in a discontinuous fashion to the addresses of the tracks (at least during Operation 4).

Figure 3:
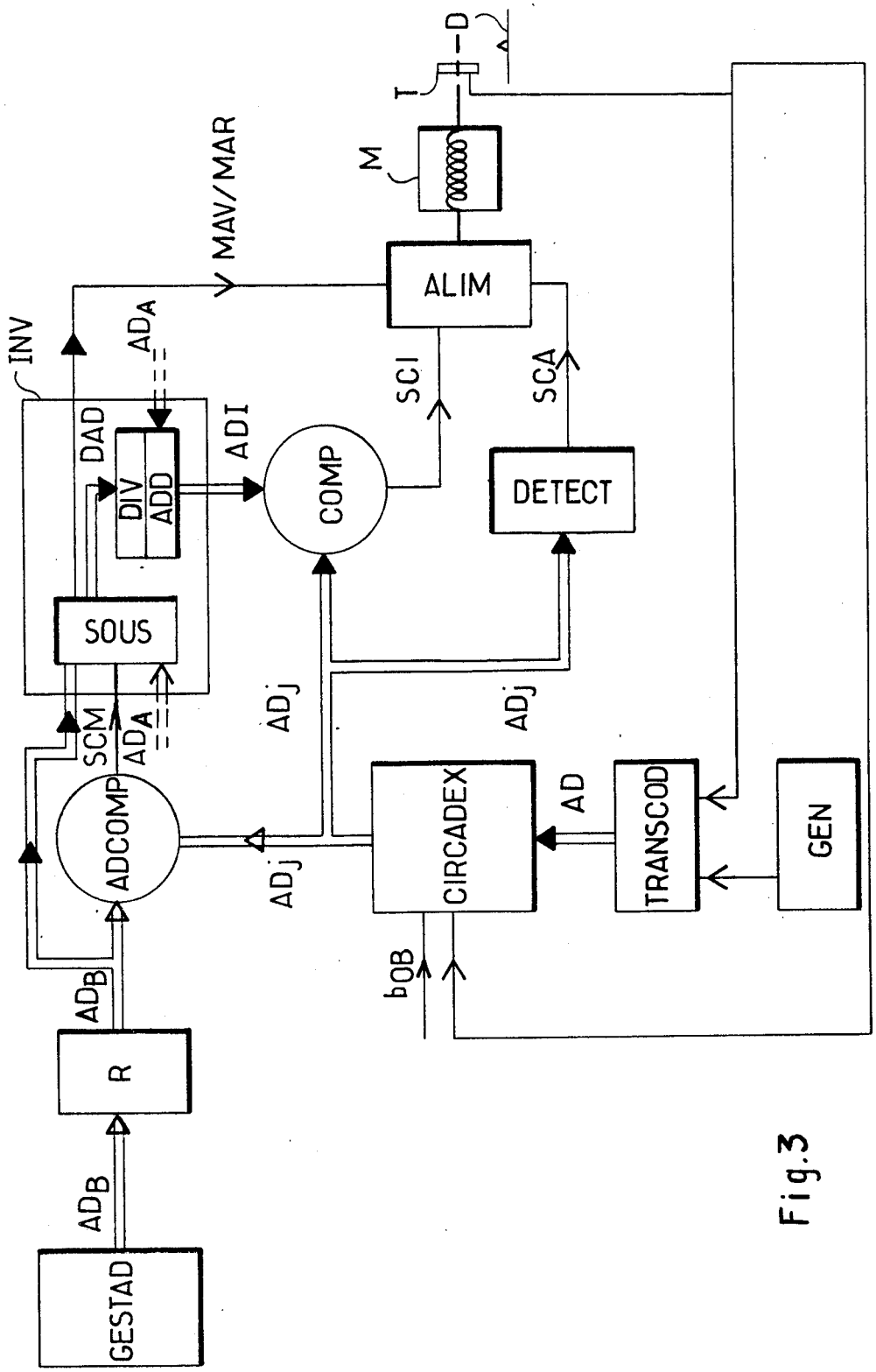
FIG. 3 is a block diagram of the arrangement according to the invention for shifting and positioning a head or member which is movable relative to a carrier for recorded information.

FIG. 3 is a block diagram for a preferred embodiment of the general layout of the shifting and positioning arrangement according to the invention.

The various main constituent parts of this arrangement are:

an address handling circuit GESTAD, which forms part of the data processing system and derives a standard binary command signal (ADB) indicative of the desired address B for head t, a register R for storing ADB, a magnetic head T for reading from and writing into the magnetic disc D, addresses are read by head T in Gray code, a sampling pulse generator GEN, a decoding register TRANSCOD responsive to the Gray code address read by head T and generator GEN for deriving a binary indication (AD) of the address read by head T, a circuit CIRCADEX responsive to AD and the Gray code read by head T for determining the initial address (ADA) of the track above which head T is situated when address ADB is supplied to register R and for determining the correct address ADj of the track above which head T is situated while the head is moving or stationary, an address comparator ADCOMP which indicates when addresses ADj and ADB are the same, a calculator INV responsive to address ADB and ADA (respectively derived from register R and circuit CIRCADEX) and the output of comparator ADCOMP for calculating the address ADI at which the current in the winding of the electrodynamic motor M is reversed, a comparator COMP for reversing the current in the winding of the electrodynamic motor M when the correct address ADj and the address ADI are the same, a detector DETECT, responsive to address ADj and unresponsive to the command address ADB, for detecting the slow speed threshold Vo, and a generator ALIM for generating the current for the electrodynamic motor M.

The generator ALIM, the motor M, the head T, the recording register TRANSCOD, circuit CIRCADEX and the address comparator ADCOMP form a closed loop for intermittently slaving the addresses of the tracks to address ADB derived from register R.

Register R receives and stores the address ADB of track B. Address ADB is fed in by, for example, an address handling circuit GESTAD of the data-processing system of which the disc memory forms a part. Address ADB is written in weighted binary code. The number of bits in this code is a function of the number of recording tracks on the magnetic disc D. Thus, in a preferred embodiment of the invention, where the number of recording tracks is 400, the binary code is a 9 bit code (a nine bit code is used because $2^9=512$, which exceeds 400). Address ADB is fed in parallel to calculator INV and to a first input of the address comparator ADCOMP.

Magnetic head T reads the address AD of a track on the disc D above which the head is situated. Address AD on disc D is expressed in Gray code and has the same number of bits as the weighted (standard) binary code in which address ADB is expressed. The signals read by the head T are formed into square-wave logic pulses by a shaping circuit, not shown in FIG. 3 to simplify the diagram. Bits indicating address AD on disc D are expressed in Gray code and are sequentially fed to decoding register TRANSCOD. Decoding register TRANSCOD receives the bits of address AD at a frequency equal to that of sampling pulses derived from sampling pulse generator GEN that is synchronized in phase and frequency by the information which is read by head T whenever the head encounters a positioning reference zone ZRPij. The period $\tau$ of each sampling pulse equals the time interval between two parts SADi and SADj of two successive sectors Si and Sj passing before head T. Decoding register TRANSCOD stores the Gray coded address AD and converts it into a parallel binary word having the same weighted binary code as that in which address ADB is expressed. Decoding register TRANSCOD supplies a parallel output indicative of address AD to circuit CIRCADEX.

Circuit CIRCADEX responds to the AD output of register TRANSCOD and the Gray code output of head T to continuously resolve any ambiguity about the read address AD which may result from the doutful bit in the output of register TRANSCOD, whereby circuit CIRCADEX determines the correct address ADj of the track above which the head is situated. Address ADj is fed by circuit CIRCADEX to comparator COMP, to the slow-speed detector DETECT, and to the second input of comparator ADCOMP. When head T is above track A of address ADA (whereby i=A), address ADA is transmitted by circuit CIRCADEX to address comparator ADCOMP, which compares address ADB with address ADA. If address ADB differs from ADA, comparator ADCOMP transmits an actuating signal SCM to calculator INV (in the embodiment being described, SCM is equal to logic zero).

Calculator INV responds to address ADB and the ADA output of circuit CIRCADEX when a new (fresh) value of ADB is supplied to register R to calculate the address ADI at which the direction of the current in the winding of motor M is to reverse. The address difference between ADB and ADA (ADB−ADA) is designated DAD.

If DAD is positive, the head is considered to move forward from track A to track B and the current in the winding is assumed initially to equal +I. If DAD is negative, the head is considered to move initially backwards and the winding equals −I. In the forward and backward directions, addresses ADI are respectively (ADA+DAD/2) and (ADA−DAD/2). When DAD is positive, the calculator INV transmits a signal MAV to the supply current generator ALIM. When DAD is negative, the reversal calculator transits a signal MAR to generator ALIM.

Comparator COMP compares the reversal address ADI, derived from calculator INV, with the address ADj (derived from circuit CIRCADEX) of the track above which the head is situated. Generator ALIM responds to comparator COMP, a MAV/MAR binary output of calculator INV and a binary, slow speed indicating output detector DETECT.

Generator ALIM controls the supply current in the winding of the motor M so the current is reversed when:

ADj>ADI in the forward direction (condition 1)
ADj≦ADI in the backward direction (condition 2).

The difference between these two conditions occurs because when head T moves forward, it encounters a positioning reference zone ZRPij before it encounters an associated address track ADj, whereas when head T moves backwards the reverse is the case. As soon as one of these two conditions has been fulfilled, comparator COMP emits a signal SCI to reverse the current derived from generator ALIM.

Slow-speed detector DETECT responds to the address read from the disc (and is unresponsive to the command address from circuit GESTAD) to determine when the speed of the head carriage drops below a predetermined very low speed threshold Vo; Vo being randomly selected. As soon as speed V is less than Vo, generator ALIM is supplied by detector DETECT with a signal SCA to cut off the current to the winding of the electrodynamic motor M. Head T then comes to a halt above a track whose correct address ADj always has the same parity as address Ad, i.e., if address AD is even, head T stops above an even numbered track, while if address Ad is odd, head T stops above an odd numbered track. Address ADj is compared with address ADB by comparator ADCOMP.

If address ADj differs from ADB, a fresh shift is required to move head T to the track whose address is ADB. In this event, ADCOMP supplies a fresh actuating signal SCM to calculator INV. If ADj is identical to ADB, it is then possible to servo-control the position of the carriage carrying the magnetic heads by means of an arrangement for servo-controlling the position of a carriage such as that which is described in a paper by M. Cardot, entitled "Servo-controlling the position of a read-head to a track on a magnetic disc, using specific information read by the head", which was presented before the Conservatoire National des Arts et Metiers on Feb. 18, 1975.

The calculator INV for calculating the reversal address ADI comprises (again see FIG. 3):

a subtractor SOUS,
a divider DIV, and
an adder ADD.

The subtractor SOUS, which receives the addresses ADA and ADB immediately prior to the initiation of a fresh shift, calculates the difference DAD between ADB and ADA as soon as the subtractor receives control signal SCM. This difference DAD is transmitted to divider DIV which calculates half the difference (DAD/2). Difference signal DAD/2 is transmitted to adder ADD, which also receives address ADA from circuit CIRCADEX. Adder ADD calculates the reversal address ADI=ADA±DAD/2 depending on whether DAD is positive or negative. If DAD is greater than 0, subtractor SOUS transmits a signal MAV to the supply generator ALIM which supplies positive current (+I) to the winding of the motor M. If DAD is less than 0, subtractor SOUS trnasmits a signal MAR to the supply generator ALIM which supplies negative current (−I) to the winding.

Figure 4:
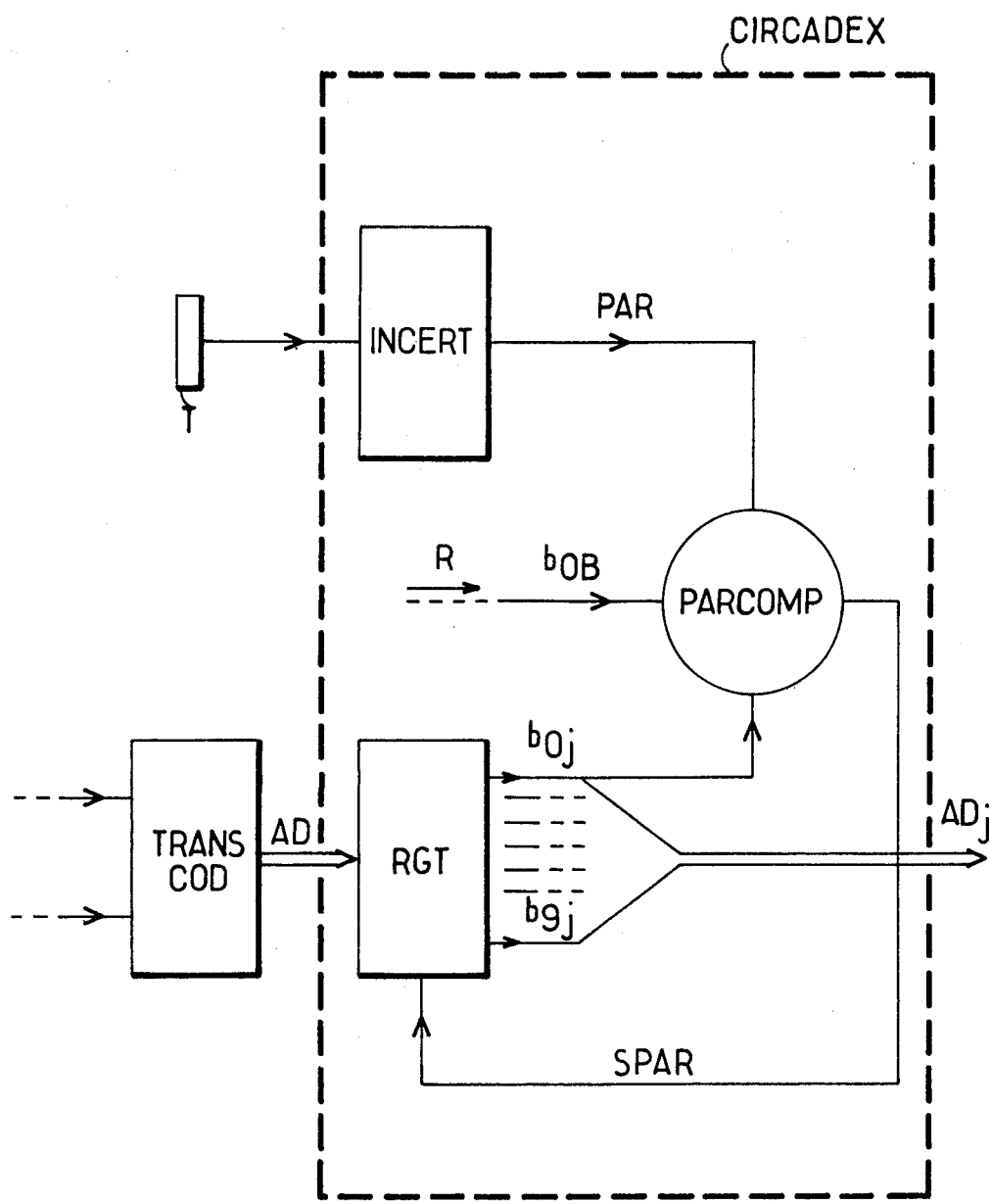
FIG. 4 is a detailed block diagram of a circuit for determining correct addresses, which circuit is included in the block diagram of FIG. 3.

As shown in FIG. 4, circuit CIRCADEX for determining the correct address comprises:

a parallel, buffer register RGT responsive to the AD output of decoder TRANSCOD,
an ambiguity position detector INCERT responsive to the Gray code, read by head T, and
a parity comparator PARCOMP.

The operation of detector INCERT is based on the principle that when the track addresses are written in Gray code, if head T is situated above a track having an even serial number, the doubtful bit is always the final one in the corresponding address (i.e., the least significant bit), whereas if the head is situated above a track having an odd serial number, the doubtful bit may be any other bit in the address.

Before being shaped, the serial bits read by head T are transmitted to the ambiguity position detector INCERT which determines the position of the doubtful bit and deduces therefrom the parity of the track address of serial number j above which the head is situated. Detector INCERT transmits a signal PAR to the first input of comparator PARCOMP. Signal PAR is a logic "one" if the address of track j is odd and a logic "zero" if the track address is even.

The principle on which circuit CIRCADEX operates is as follows: comparator PARCOMP compares the parities of the correct address ADj and the read address Ad. The parity of the correct address ADj is determined by the ambiguity position detector INCERT, while the parity of the read address AD is indicated by the least significant bit boj of this address, which is stored in and read from register RGT (of course, the parity of a number expressed in binary code is determined by the least significant digit).

Decoding register TRANSCOD transmits the read address AD to register RGT which transmit bit boj to the second input of comparator PARCOMP. If signals PAR and boj are identical, the read address AD is equal to address ADj and is fed by register RGT directly to comparator COMP, slow speed detector DETECT and comparator ADCOMP. If signals PAR and boj are not identical, comparator PARCOMP feeds a logic one signal SPAR equal to register RGT. In response to the logic one value of signal SPAR, the value stored in register RGT is reduced by one and the address Adj−=ADj−1 is thus obtained; address ADj−1 is transmitted to members COMP, DETECT and ADCOMP.

Reference is now made to FIG. 6. As shown in the previously cited paper, head T always stops above a track having an address Adj of the same parity as track ADB. It is necessary to determine this address as soon as possible so that, if ADj differs from ADB, a fresh shift can be made as quickly as possible.

The principle adopted for checking the track above which the head T stops is as follows. As soon as the current to motor M is cut off, head T stops above the track whose address ADj is closest to track B and of identical parity; but, as can be seen in FIG. 6, either ADj or ADj+1 may be read. If head T is outside the ambiguity band Bj in which the reading ambiguity can be resolved (using circuit CIRCADEX), it is necessary to correct the read address to know from then on the correct address ADj where the head will stop and to which position the head should be slaved if a fresh shift were not made. For this purpose the parity comparator PARCOMP receives bit boj and the corresponding least significant bit boB of address ADB, as derived from register R. Comparator PARCOMP then compares the parities of addresses ADB and ADj. There are two possibilities: (1) the parities are identical, in which case the signal SPAR fed to register RGT equals a logic zero and address ADj is fed by register RGT to address comparator ADCOMP where it is compared with address ADB; (2) the parities are not identical, in which case signal SPAR equals a logic 1, whereby the content of register RGT is reduced by one and the address ADj−1 obtained in this way is then fed to comparator ADCOMP.

Figure 5:
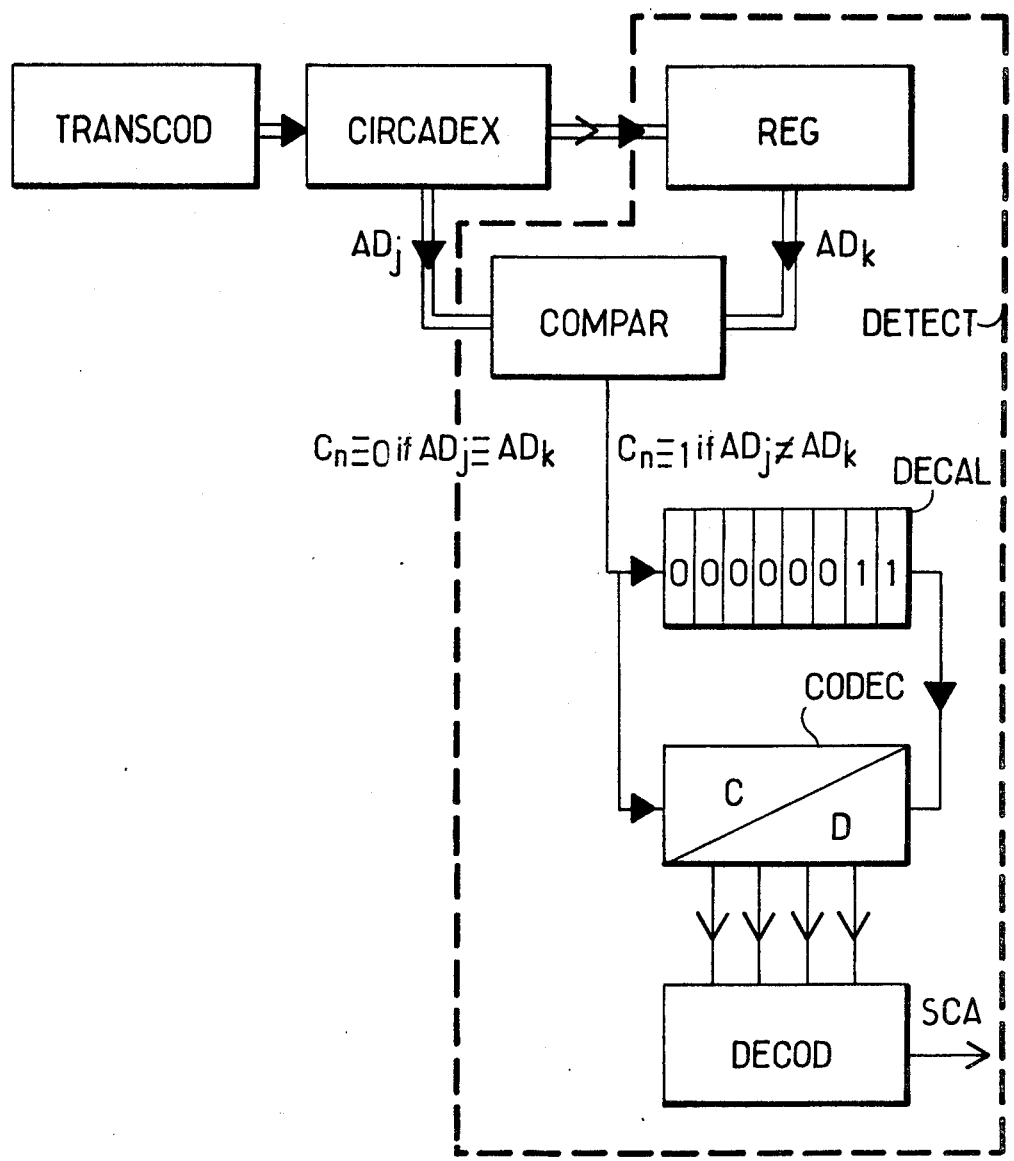
FIG. 5 is a detailed block diagram of the slow-speed threshold detector included in the block diagram belonging to the arrangement of FIG. 3.

Slow speed detector DETECT, shown in detail in FIG. 5, comprises:

a parallel, buffer register REG, responsive to the output of CIRCADEX, as delayed by one time slot, so while circuit CIRCADEX derives address Adj, register REG derives the previous address ADk, a comparator COMPAR, responsive to the ADj output of CIRCADEX, an eight-bit shift register DECAL, responsive to the output of comparator COMPAR, a bi-directional counter CODEC that is respectively driven in the forward and backward directions by the inputs and outputs of register DECAL, and a decoder DECOD for deriving signal SCA (indicative of the slow speed being detected) responsive to the parallel output of counter CODEC.

Circuit CIRCADEX drives a first input of comparator COMPAR and an input of register REG. The output of register REG is connected to a second input of comparator COMPAR, having an output connected in parallel to the input of shift register DECAL and to an increment, i.e., forward counting, input of bi-directional counter CODEC. The output of shift register REG drives a decrement, i.e., backward counting, input of bi-directional counter CODEC, having an output connected to drive the input of decoder DECOD, having an output connected to generator ALIM. The counting capacity of bi-directional counter CODEC is at least equal to the number of locations in shift register DECAL. Bi-directional counter CODEC counts up the number of logic "ones" which enter register DECAL and counts down the number of logic "ones" which leave it.

When, at a given moment t, head T passes above a zone ZRPij associated with the recording track of serial number j, circuit CIRCADEX feeds an address ADj to comparator COMPAR. At the same moment t, register REG contains the address ADk of the track above which the head was situated at time $t-1=(t-\tau)$. The two addresses ADk and ADj are compared by comparator COMPAR. When address ADk differs from address ADj, the signal Cn emitted by comparator COMPAR is equal to logic 1. When these same addresses are identical, signal Cn is equal to logic zero.

In practice, when the carriage bearing the magnetic head T is travelling at slow speeds, i.e., at the beginning of the acceleration phase, close to point A, and at the end of the deceleration phase, close to point B (see FIG. 1), the difference between addresses ADj and ADk is one or zero, whereby Cn is equal to logic zero or logic one at these times. At high speeds (close to point C) the difference ADj−ADk is equal to or greater than 1, whereby at these times Cn is always equal to logic "one".

When the comparison between ADj and ADk has taken place, circuit CIRCADEX transfers address ADj to register REG. Signal Cn is fed in parallel to register DECAL and to the forward-counting input of bi-directional counter CODEC. Shift register DECAL thus contains the result of the last eight comparisons between the correct addresses contained in the last nine positioning reference zones in the nine sectors Si. . . . Si-8 which the head successively encountered during a period equal to $8 \times \tau$. When head T is immobile above the track whose address is ADA, it is clear that register DECAL contains only zeros and all of the bits in bi-directional counter CODEC are zeros, i.e., the count of counter CODEC is zero. When head T moves from the track of address ADA towards the track of address ADB (it is assumed that the two tracks are fairly far apart) the contents of register DECAL progressively alter until the register contains all logic ones. The count of bi-directional counter CODEC then is and remains equal to eight. The count of counter CODEC does not alter because it simultaneously receives logic ones at its forward and backward counting inputs.

When head T approaches track B, at address ADB, its speed becomes sufficiently slow that, from a part SADi−1 of a section Si−1 to a part SADi of the next sector, the head does not cross more than one track and remains above the same track. Thus, in this slow speed range it is assumed that the number of logic ones contained in the register, i.e., the content of bi-directional counter CODEC, equals the number of tracks crossed by the head T during time $t=8 \times \tau$. It is thus seen that in the slow speed range the content of bi-directional counter CODEC is directly proportional to the speed of head T. In the embodiment presently being described, the content of register DECAL changes until it is, for example, 00000011, as shown in FIG. 5, at which time, the count of bi-directional counter CODEC equals two. In response to counter CODEC storing a count of two, decoder DECOD transmits signal SCA to generator ALIM, to cut off the current supplied to motor M.

Although what is described in the foregoing and illustrated in the accompanying drawings is an arrangement for shifting and positioning a translatable head relative to a magnetic disc, it is understood that the shifting and positioning arrangement could be applied to any system which is able to move (be it to translation or in rotation for example) relative to any carrier for recorded information (be it a magnetic or some other kind of carrier), without thereby departing from the scope of the invention.

What is claimed is:

1. A method of shifting a head which is movable relative to a carrier for recorded information carried by a plurality of recording tracks, the addresses of the tracks being recorded on the carrier in a plurality of reference zones at least equal in number to the tracks, each track being associated with at least one zone, the head being moved by an electric motor and reading the information, the head being shifted from a starting track A to a destination track B, the addresses of which are supplied by an address handling circuit, comprising accelerating the head from track A to track C by feeding the motor with a constant current, from track A to a track C at which the current is reversed, track C being between tracks A and B, decelerating the head when it reaches track C by reversing the current supplied to the motor, wherein the addresses of the tracks are recorded in reflected binary code, calculating the address of track C as a function of the addresses of tracks A and B, expressing addresses A, B and C in weighted binary code, storing the addresses of the tracks read in reflected binary code by a reading member when a shift occurs, the reading head being capable of being positioned and arranged relative to the recorded track addresses so that the initial recorded track address can be ambiguously read in reflected binary code either as the correct address for the initial track or the address of the track adjacent the correct initial track, decoding the stored reflected binary code into weighted binary code indicative of the correct initial address despite existence of the ambiguity, comparing the decoded addresses with the calculated address of track C while the head is accelerated from track A to track C by the constant current, decelerating the head from track C with the reversed current until the speed of the head is detected as lower than a minimum threshold Vo, comparing the address of the track at which the head comes to a halt with the address of track B, and initiating a fresh shift made if the addresses compared during the immediately previous step differ.

2. The method of claim 1 wherein the correct initial address is determined in response to the initial recorded track address read in reflected binary code by the head and an output of a sampling pulse generator.

3. Apparatus for shifting a head T which is movable relative to a carrier for recorded information carried by a plurality of recording tracks, the addresses of the tracks being recorded on the carrier in a plurality of reference zones at least equal in number to the tracks, each track being associated with at least one zone, the head being moved by an electric motor M and reading the information which is shifted from a starting track A to a destination track B, the addresses of which are supplied by an address handling circuit, comprising a generator ALIM for supplying accelerating and decelerating currents to the motor, means R responsive to the address handling circuit for storing information indicative of address B, a generator GEN for generating sampling pulses, means TRANSCOD responsive to the output of the head and to the output of generator GEN for storing and decoding the addresses AD read by the head, a circuit CIRCADEX responsive to the output of the storage and decoding means TRANSCOD for determining the correct address ADj of the recording track at which the head is situated, an address comparator ADCOMP responsive to the output of means R and to the output of circuit CIRCADEX, a reversed calculator INV responsive to circuit CIRCADEX, storage means R and address comparator ADCOMP for calculating the address ADI of track C, track C being a track between tracks A and B wherein the current supplied by the generator to the motor is reversed, calculator INV having a first output which is connected to a first input of the current generator ALIM, a closed loop being formed by generator ALIM, electric motor M, head T, the storage and decoding means TRANSCOD, circuit CIRCADEX, the first comparator ADCOMP, and the reversal calculator INV, and the address comparator COMP to compare addresses ADj and ADI.

4. An arrangement as claimed in claim 3 wherein the storage means R is formed by a register.

5. An arrangement as claimed in claim 3 wherein means TRANSCOD includes a register and a decoding circuit, the register means TRANSCOD having a series input responsive to addresses AD read by the head, and the decoding circuit deriving a parallel output signal representing the addresses AD.

6. The apparatus of claim 3 wherein the circuit CIRCADEX comprises: a parallel buffer register RGT responsive to the output of means TRANSCOD, register RGT including parallel outputs driving inputs of comparators ADCOMP and COMP and calculator INV, a detector INCERT responsive to the outputs of the head for detecting the position of ambiguities, and a parity comparator PARCOMP responsive to the output of detector INCERT and a least significant digit of the addresses derived from register RGT for indicating if the address detected by the head and indicated by register RGT are both even or both odd, the indication derived from comparator PARCOMP being supplied to register RGT.

7. The apparatus of claim 3 wherein the calculator INV comprises a subtractor SOUS, a divider DIV, and an adder ADD, the subtractor being responsive to the addresses ADA and ADB respectively emitted by the circuit CIRCADEX and the storage means R to derive a difference DAD signal indicative of (ADB−ADA), said difference signal being supplied to divider DIV for deriving a signal indicative of DAD/2, the signal indicative of DAD/2 being coupled from divider DIV to adder ADD, adder ADD being responsive to DAD/2 and address ADA to calculate intermediate address ADI=ADA±DAD/2, and means for feeding address ADI to comparator COMP.

8. The apparatus of claim 3 wherein the low speed detector comprises a parallel register REG, a comparator COMPAR, an eight bit shift register DECAL, a bi-directional counter CODEC, and a decoder DECOD, circuit CIRCADEX having an output for driving a first input of comparator COMPAR and an input of register REG, register REG having an output which is connected to a second input of comparator COMPAR, comparator COMPAR having an output for driving an input of register DECAL and a foward counting input of bi-directional counter CODEC, register DECAL having an output for driving a backward counting input of the bi-directional counter, the bi-directional counter having an output for driving an input of decoder DECOD, decoder DECOD having an output for driving current generator ALIM.

9. The apparatus of claim 3 wherein the carrier for recorded information is a magnetic disc of a magnetic disc memory.

10. Apparatus of the bang-bang type for shifting and positioning a head T which is movable relative to a carrier for recorded information, the apparatus being responsive to weighted, binary information indicative of a destination address ADB in an address handling circuit, the information being carried by a plurality of information recording tracks having addresses recorded on the carrier in a plurality of positioning reference zones on the carrier in a plurality of positioning reference zones at least equal in number to the number of tracks, each track being associated with at least one zone, the head being at an initial address ADA, comprising an electric motor M for driving the head, the head including at least one member for reading the address information AD contained on the carrier, a generator ALIM for generating supply current for the motor, a circuit for handling the addresses of the tracks, the addresses of the tracks being recorded in a reflected binary code, means R responsive to the address handling circuit for storing weighted information indicative of address ADB, a generator GEN for generating sampling pulses, means TRANSCOD responsive to the output AD of the reading member and to the sampling pulses for storing and decoding the addresses AD read by the reading member into weighted, binary code, a circuit CIRCADEX for determining the correct address ADj of the recording track AD above which the reading head is situated, circuit CIRCADEX having an input responsive to the output AD of the storing and decoding means TRANSCOD, a first address comparator ADCOMP responsive to the output ADB of storage means R and to the output ADj of circuit CIRCADEX, a reversed calculator INV for calculating the address ADI for reversal of current in the motor, calculator INV having inputs responsive to the output ADj of circuit CIRCADEX, output ADB of storage means R, and the output of address comparator ADCOMP indicating that ADB is not equal to ADA, calculator INV having a first output indicative of the direction of drive for the head and for driving a first input of the generator ALIM, a closed loop being formed by the combination of generator ALIM, the electric motor M, the information reading member, the storage and decoding means TRANSCOD, circuit CIRCADEX, the first comparator ADCOMP, and the reversal calculator INV, a second address comparator COMP having inputs responsive to the output ADj of circuit CIRCADEX and to the output ADI of calculator INV, comparator COMP having an output SCI for the current of generator ALIM to be reversed when the reading member reaches address ADI and for driving a second input of generator ALIM, a slow speed detector DETECT having an input responsive to the output ADj of circuit CIRCADEX and an output SCA for cutting off the current of generator ALIM when the speed of the head is less than a threshold Vo and for driving a third input of generator ALIM, and comparator ADCOMP including means for checking whether the address ADj of the track above which the reading member has come to a halt equals ADB and for emitting a fresh actuating signal to calculator INV if address ADj differs from ADB.

11. The apparatus of claim 10 wherein the carrier for recorded information is a magnetic disc of a magnetic disc memory.

* * * * *